(12) United States Patent
Murray

(10) Patent No.: US 6,643,947 B2
(45) Date of Patent: *Nov. 11, 2003

(54) RULE ASSEMBLY WITH INCREASED BLADE STANDOUT

(75) Inventor: John C. Murray, Canton, CT (US)

(73) Assignee: The Stanley Works, New Britain, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/987,709

(22) Filed: Nov. 15, 2001

(65) Prior Publication Data

US 2002/0078585 A1 Jun. 27, 2002

Related U.S. Application Data

(63) Continuation of application No. 09/366,781, filed on Aug. 4, 1999, now Pat. No. 6,324,769.

(51) Int. Cl.$^7$ .................................................. G01B 3/10
(52) U.S. Cl. .......................................... 33/755; 33/757
(58) Field of Search ........................ 33/755, 757, 559, 33/760, 761, 769; 242/381.3, 381.6

(56) References Cited

U.S. PATENT DOCUMENTS

| | | | |
|---|---|---|---|
| 1,730,199 A | 10/1929 | Farrand | 242/396.6 |
| 1,964,248 A | 6/1934 | Buck et al. | 33/771 |
| 2,050,941 A | 8/1936 | Farrand | 33/771 |
| 2,809,142 A | 10/1957 | Beeber et al. | 33/770 |
| 3,630,104 A | 12/1971 | Milner | 81/487 |
| 3,716,201 A | 2/1973 | West | 242/375.2 |
| 4,275,503 A | 6/1981 | Bergkvist | 33/757 |
| 4,352,244 A | 10/1982 | Tomuro | 33/757 |
| 4,429,462 A | 2/1984 | Rutty et al. | 33/757 |
| 4,459,753 A | * 7/1984 | Nagasawa et al. | 33/701 |
| 4,487,379 A | 12/1984 | Drechsler et al. | 242/375.2 |
| 4,578,867 A | 4/1986 | Czerwinski et al. | 33/765 |
| 4,930,227 A | 6/1990 | Ketchpel | 33/755 |
| 4,972,601 A | 11/1990 | Bickford et al. | 33/770 |
| 4,976,048 A | 12/1990 | Blackman | 33/767 |
| 5,210,956 A | 5/1993 | Knispel et al. | 33/761 |
| 5,699,623 A | 12/1997 | Lee | 33/758 |

(List continued on next page.)

FOREIGN PATENT DOCUMENTS

DE  2946706  5/1981

OTHER PUBLICATIONS

GINDAS advertisement in Mar. 1997 Hardwares.

Primary Examiner—Diego Gutierrez
Assistant Examiner—R. Alexander Smith
(74) Attorney, Agent, or Firm—Pillsbury Winthrop LLP

(57) ABSTRACT

The present invention comprises a retractable rule assembly that includes a housing assembly and a reel rotatably mounted in the housing assembly. An elongated blade formed of a ribbon of metal is mounted on the reel. One end of the blade is connected to the reel. The blade is constructed and arranged with respect to the housing assembly to extend from a position tangential to the reel outwardly through a spaced opening in the housing assembly. A coil spring that is formed of a ribbon of metal has a construction and arrangement between the housing assembly and the reel to rotate the reel in the housing assembly in a direction to wind the elongated blade about the reel when the blade is extending outwardly of the housing assembly opening. The blade has a "normal" concavo-convex cross-sectional configuration when extended and has a flat cross-sectional configuration when it is wound about the reel so that the wound reel is disposed about the reel in an abutting volute coil formation. A blade holding assembly is provided which can hold the blade in any position of extension outwardly of the housing assembly opening and to release the blade from any position in which it is held. The blade has a width in its flattened configuration thereof within the range of 1.10"–1.5" and a height in its concavo-convex configuration thereof within the range of 0.25"–0.40".

11 Claims, 10 Drawing Sheets

U.S. PATENT DOCUMENTS

| | | | |
|---|---|---|---|
| 5,806,202 A | 9/1998 | Blackman et al. | 33/767 |
| 6,243,964 B1 | 6/2001 | Murray | 33/769 |
| 6,249,986 B1 * | 6/2001 | Murray | 33/771 |
| 6,282,808 B1 | 9/2001 | Murray | 33/769 |
| 6,324,769 B1 * | 12/2001 | Murray | 33/755 |
| 6,367,161 B1 * | 4/2002 | Murray et al. | 33/757 |
| 6,449,866 B1 * | 9/2002 | Murray | 33/758 |
| 6,473,986 B1 * | 11/2002 | Sun | 33/757 |

\* cited by examiner

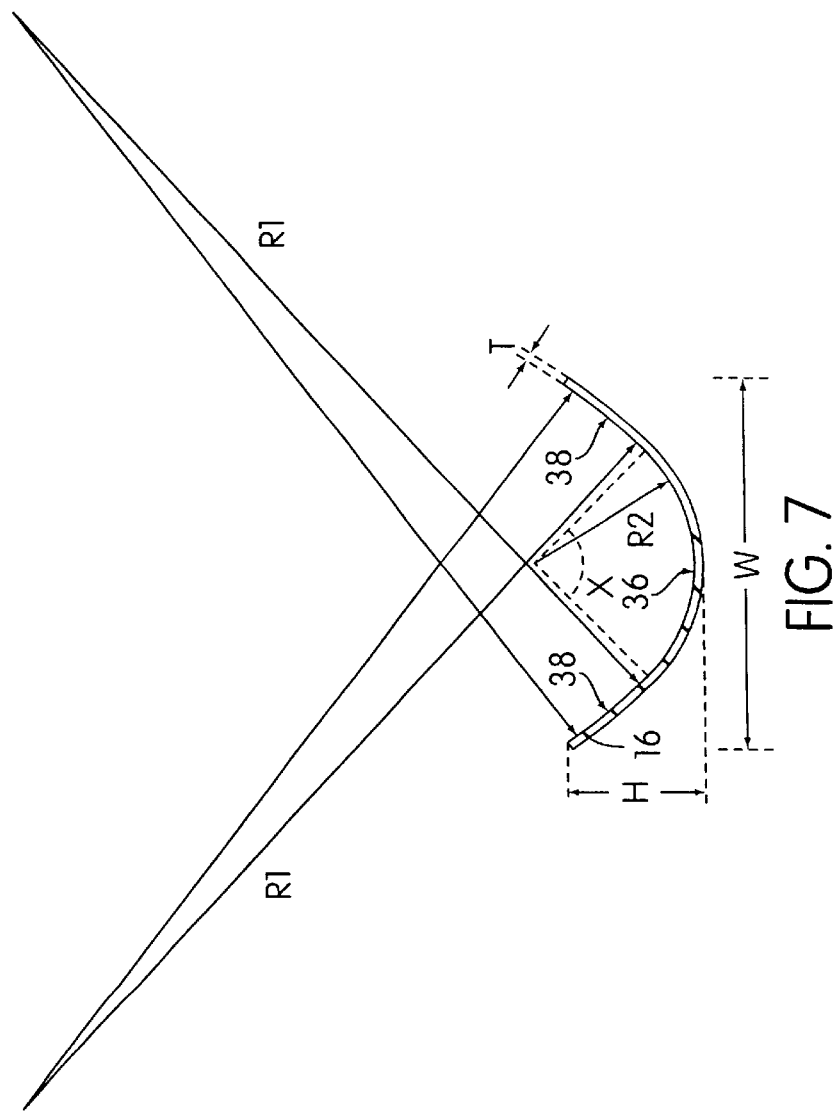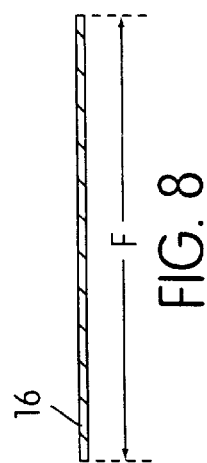

| *BLADE / SPRING WIDTH (IN) | *BLADE / SPRING THICKNESS (IN) | "ARCUATE" LENGTH-OUT "C" (IN / FT) [RANGE +/- 6 (IN)] | *LINEAR LENGTH-OUT "B" (IN) [RANGE +/- 3%] | TAPE RULE REQUIRED HEIGHT TO ACHIEVE FULL BLADE EXTENSION "A" (IN) [RANGE +/- 3%] | PERCENT LINEAR TO ARCUATE LEGNTH-OUT | **MAXIMUM TAPE RULE ROTATION ANGLE "D" AT FULL EXTENSION (DEGREES) |
|---|---|---|---|---|---|---|
| 1.000 / 0.875 | 0.0045 / 0.0051 | 84 / 7 FT | 79 | 23 | 94% | >45 |
| 1.000 / 0.875 | 0.0051 / 0.0056 | 84 / 7 FT | 80 | 22 | 95% | >45 |
| 1.000 / 0.875 | 0.0051 / 0.0056 | 96 / 8 FT | 86 | 40 | 90% | >45 |
| 1.000 / 0.875 | 0.0056 / 0.0060 | 84 / 7 FT | 81 | 18 | 96% | >45 |
| 1.000 / 0.875 | 0.0056 / 0.0060 | 96 / 8 FT | 91 | 31 | 95% | =/<35 |
| 1.000 / 0.875 | 0.0056 / 0.0060 | 108 / 9 FT | 93 | 53 | 86% | =/<25 |
| 1.250 / 1.250 | 0.0051 / 0.0051 | 84 / 7 FT | 83 | 5 | 99% | >45 |
| 1.250 / 1.250 | 0.0051 / 0.0051 | 96 / 8 FT | 95 | 8 | 99% | >45 |
| 1.250 / 1.250 | 0.0051 / 0.0051 | 108 / 9 FT | 107 | 17 | 99% | >45 |
| 1.250 / 1.250 | 0.0051 / 0.0051 | 120 / 10 FT | 119 | 30 | 99% | >45 |
| 1.250 / 1.250 | 0.0051 / 0.0051 | 132 / 11 FT | 129 | 38 | 98% | >45 |

(First 6 rows labeled PRIOR ART)

* BLADE WIDTH MEASURED IN FLAT FORM OR ARCUATE PERIMETER OF THE CROSS SECTION
** RAW STEEL THICKNESS WITHOUT COATING(S)
*** ACTUAL UTILITY OF TAPE BLADE STANDOUT
**** ROTATION ANGLE REQUIRED WHEN MEASURING VERTICAL POINTS ABOVE HORIZONTAL PLANE OF BLADE TIP

FIG. 9

RULE ASSEMBLY WITH INCREASED BLADE STANDOUT

This application is a continuation of U.S. application Ser. No. 09/366,781, filed Aug. 4, 1999, now U.S. Pat. No. 6,324,769, the entirety of which is hereby incorporated by reference.

The present invention is generally related to retractable tape rule assemblies and more particularly to tape rule assemblies of the spring retractable type.

BACKGROUND OF THE INVENTION

Spring retractable rule assemblies have been available commercially for many years. It is also known in the tape rule industry to provide a concavo-convex tape rule blade with a standard width dimension of ¼", ½", ¾" or 1", with a height dimension as high as 0.226" as disclosed in U.S. Pat. No. 4,429,462 to Rutty et al. There always exists a need to provide a retractable rule assembly that presents new and innovative blade configurations.

BRIEF DESCRIPTION OF THE INVENTION

The present invention comprises a retractable rule assembly that includes a housing assembly and a reel rotatably mounted in the housing assembly. An elongated blade formed of a ribbon of metal is mounted on the reel. One end of the blade is connected to the reel. The blade is constructed and arranged with respect to the housing assembly to extend from a position tangential to the reel outwardly through a spaced opening in the housing assembly. A coil spring that is formed of a ribbon of metal has a construction and arrangement between the housing assembly and the reel to rotate the reel in the housing assembly in a direction to wind the elongated blade about the reel when the blade is extending outwardly of the housing assembly opening. The blade has a "normal" concavo-convex cross-sectional configuration when extended and has a flat cross-sectional configuration when it is wound about the reel so that the wound reel is disposed about the reel in an abutting volute coil formation. A blade holding assembly is provided which can hold the blade in any position of extension outwardly of the housing assembly opening and to release the blade from any position in which it is held. The blade has a width in its flattened configuration thereof within the range of 1.10"–1.5" and a height in its concavo-convex configuration thereof within the range of 0.25"–0.40".

It is also contemplated to provide a wide range of tape assembly embodiments having increased blade standout. More particularly, in the more specific aspects of the present invention, it is a further objective to provide a retractable rule assembly having a blade constructed according to the principles briefly described above to provide the improved standout characteristics previously described with any combination of the following additional features:

1. A retractable rule assembly wherein a relatively short free end portion of the blade has a clear film of plastic material adhered to a concave side thereof.
2. A retractable rule assembly wherein the metal ribbon of the spring has a width which is 95%–120% of the width of the metal ribbon of the blade.
3. A retractable rule assembly wherein the blade has an end hook member on the free end thereof, the end hook member being formed of sheet metal of a predetermined thickness to include a concavo-convex mounting portion having a U-shaped hook portion bent at a generally right angle from an end thereof, the end hook member being mounted on the free end of the blade with the mounting portion thereof secured in limited sliding engagement with a concave side of the free end of the blade so that the rule can be measured externally from an exterior surface of the U-shaped hook portion or internally from an interior surface of the U-shaped hook portion, the U-shaped hook portion including a bight section extending transversely from a convex side of the free end of the blade and spaced leg sections extending beyond transversely spaced corners of the free end of the blade.
4. A retractable rule assembly wherein the housing assembly includes a pair of cooperating housing members, each including an end wall having a peripheral wall extending from a periphery thereof and terminating in a free edge, the housing members being fixed together with their free edges interengaged by a plurality of bolts extending through one of the housing members and threadedly engaged in the other at spaced positions adjacent the peripheral walls thereof and by a fixed reel spindle having a non-circular interengaging recess-projection connection at each end thereof with the central interior of the adjacent end wall, each end of the spindle being interiorly threaded to threadedly receive a bolt therein extending through a central hole in the adjacent end wall and the recess-projection connection between the central hole and threaded interior.
5. A retractable rule assembly wherein the housing assembly includes a fitment defining a part of the housing assembly opening adjacent a convex side of the blade, the fitment having a plurality of tangentially extending transversely spaced elongated ridges defining surfaces for engaging the convex side of the blade extending tangentially from the reel to said housing assembly opening.
6. The housing assembly includes a bottom wall having an exterior portion at an end position adjacent the housing assembly opening which projects below the exterior surface portion extending therefrom toward an opposite end to provide a finger grip enhancing configuration.
7. The housing opening has a height dimension which exceeds the height dimension of the blade an amount that is at least approximately equal to the amount the hook portion extends below the bottom end surface of the housing assembly at the housing opening.

In the broader aspects of the present invention, it is an objective to provide any known retractable rule assembly with improved blade standout by constructing a blade therefor to have the blade cross-sectional geometry briefly described above and/or the blade dimensions as previously described.

These and other objectives, features, and advantages of the present invention will become apparent from the following detailed description, the accompanying drawings, and the appended claims.

DESCRIPTION OF THE DRAWINGS

FIG. 7 is a transverse cross-sectional view taken through a portion of the extended blade;

FIG. 8 is a transverse cross-sectional view taken through a portion of the blade when the blade is in a flattened configuration;

FIG. 9 is a table showing a comparison of the construction and standout characteristics of a plurality of exemplary prior art tape rule assemblies with an embodiment of the tape rule assembly constructed according to the principles of the present invention;

DETAILED DESCRIPTION OF THE INVENTION

Figure 1:
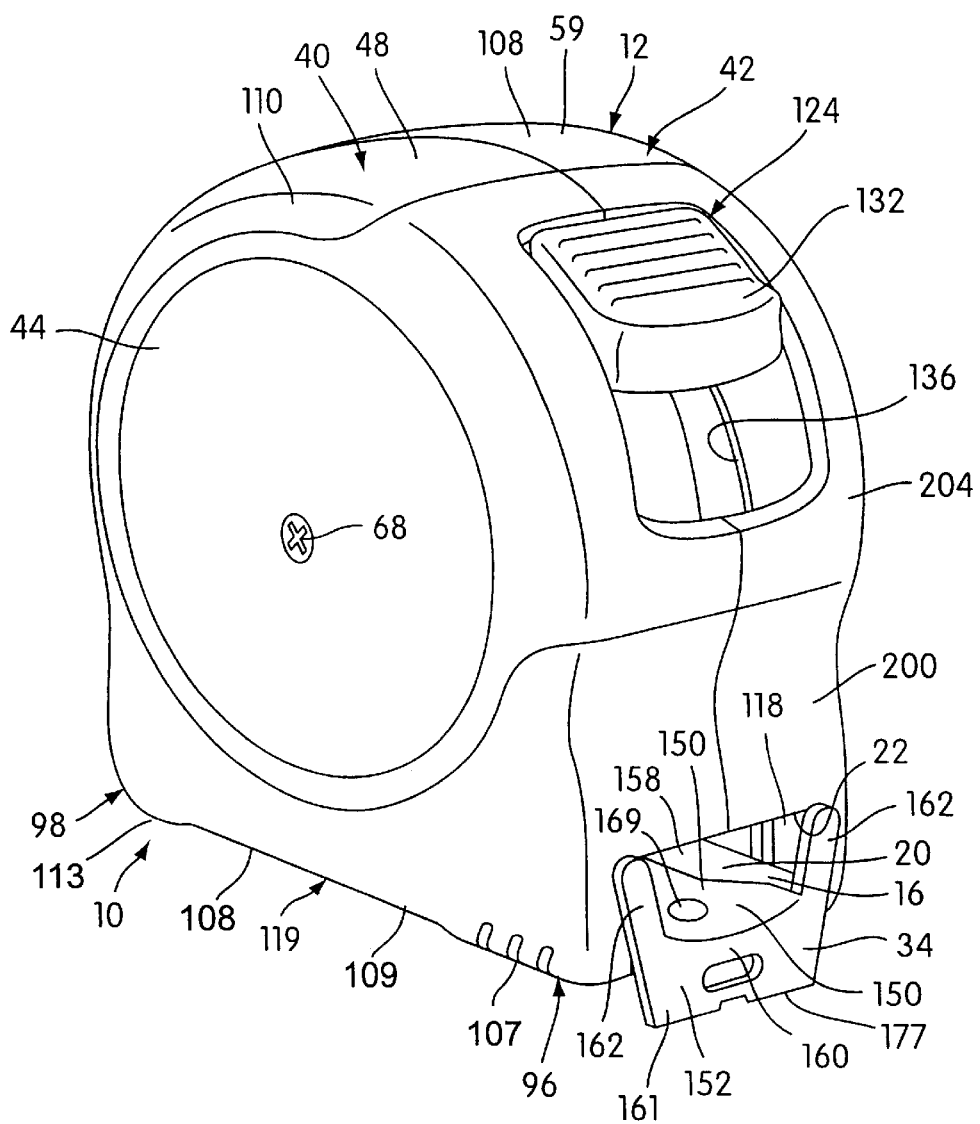
FIG. 1 shows a prospective view of a tape rule assembly constructed according to the principles of the present invention.
Figure 2:
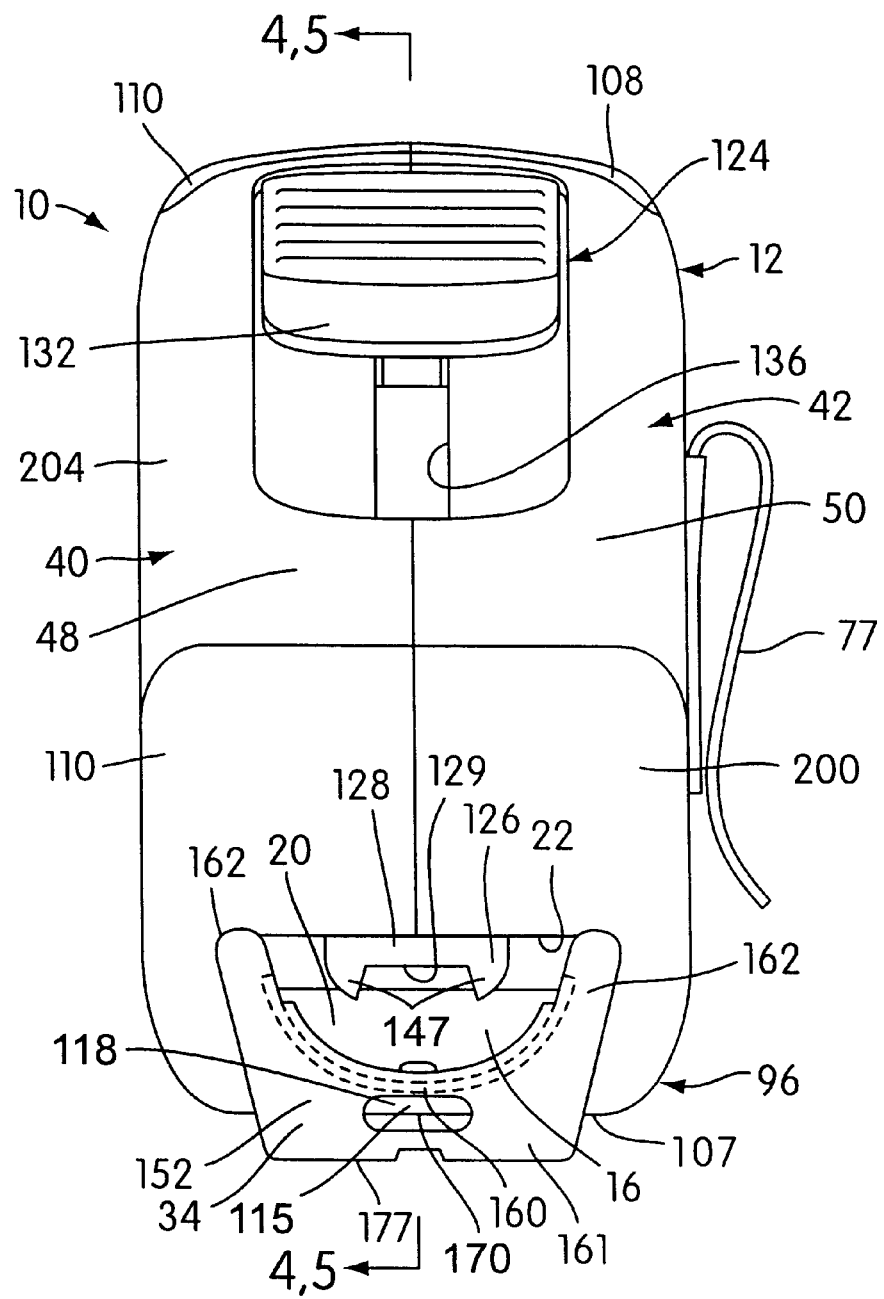
FIG. 2 shows a front of elevational view of the tape rule assembly.
Figure 3:
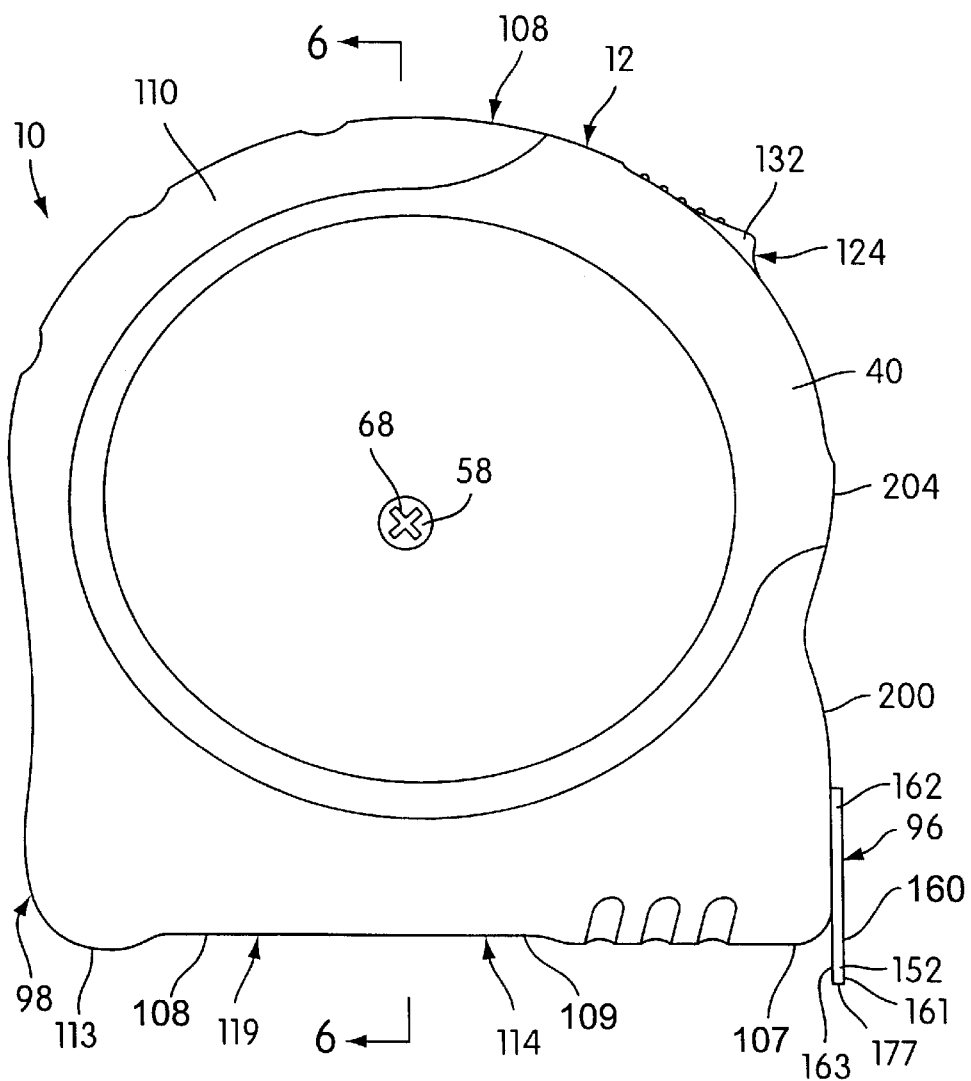
FIG. 3 shows a side of elevational view of the tape rule assembly.
Figure 4:
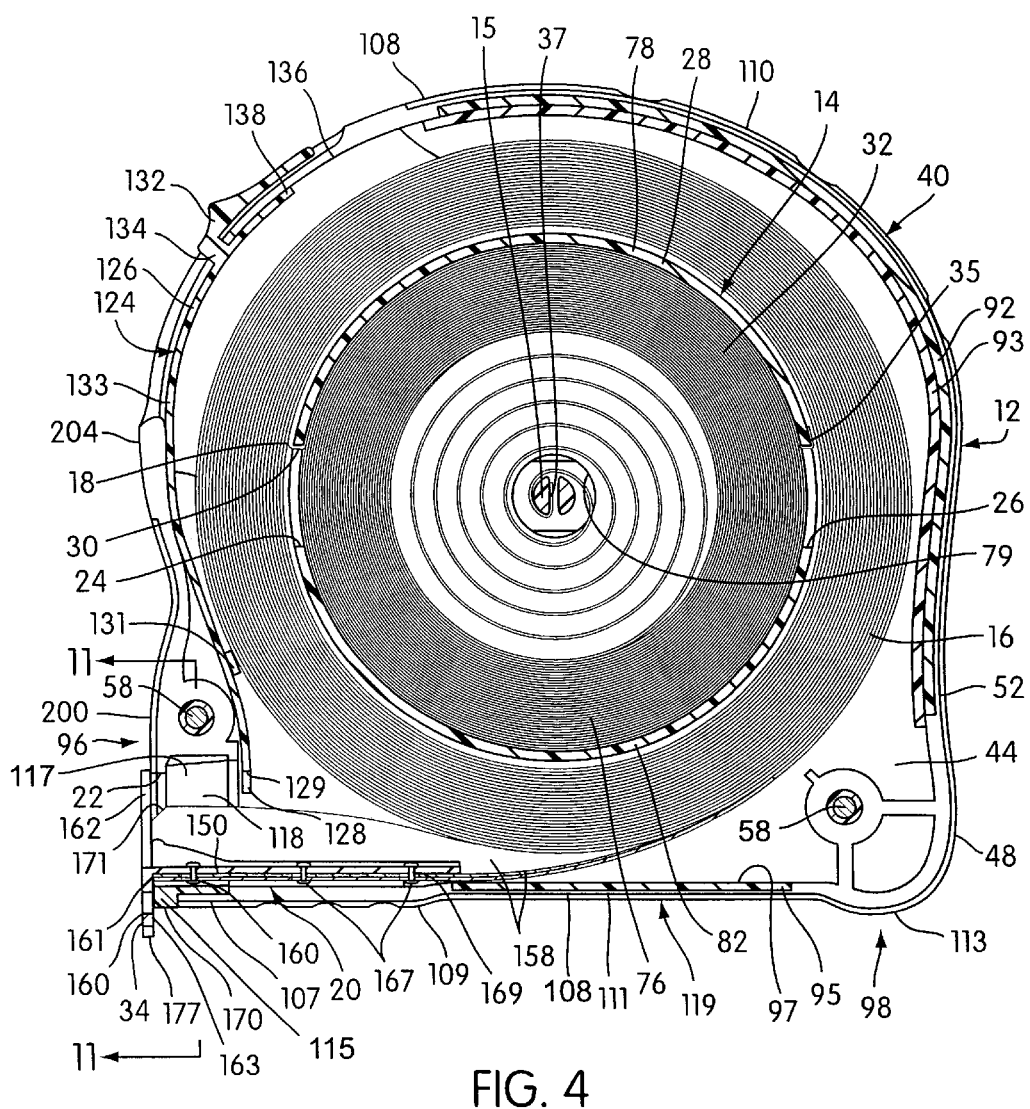
FIG. 4 shows a cross-sectional view of the tape rule assembly taken through the line 4—4 in FIG. 2 showing a blade thereof in a fully retracted configuration.
Figure 5:
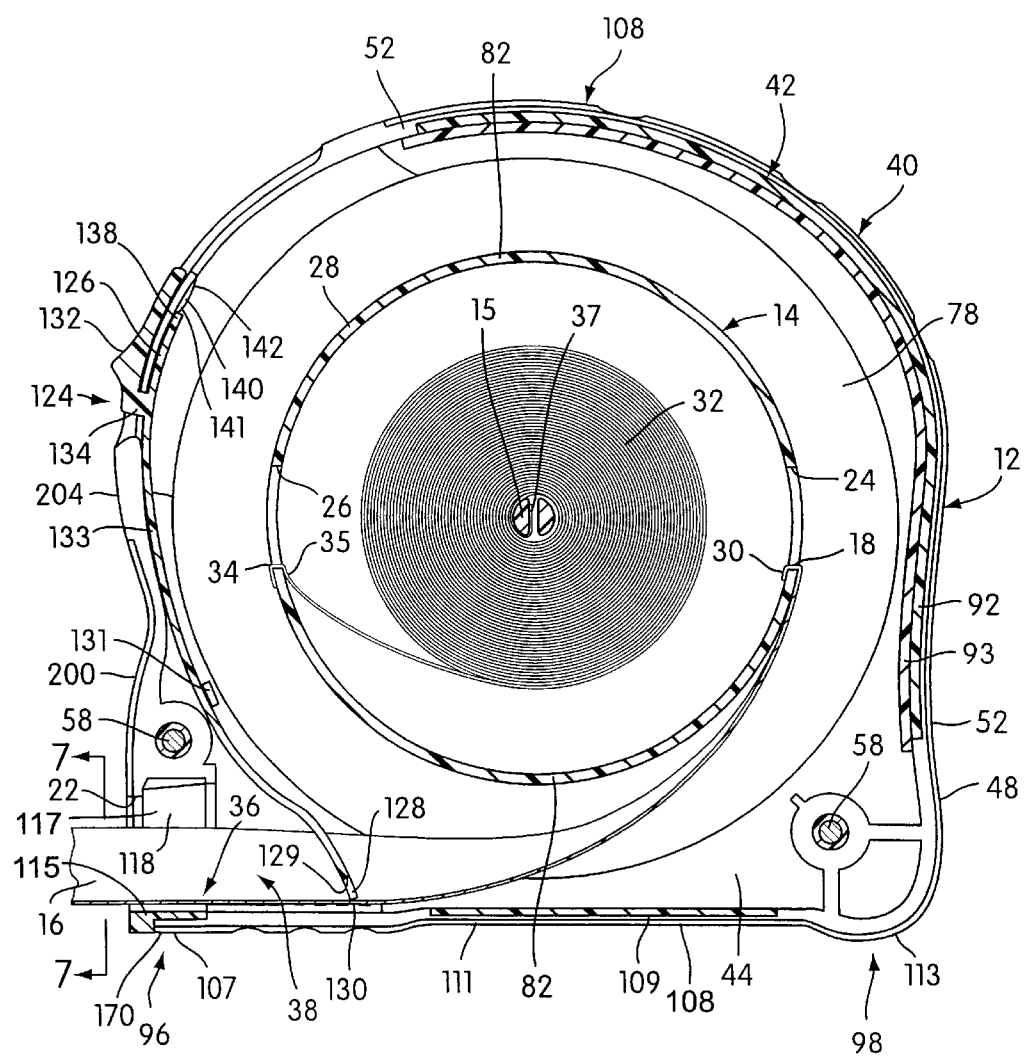
FIG. 5 is a view similar to FIG. 4 except showing the blade in a fully extended configuration.
Figure 6:
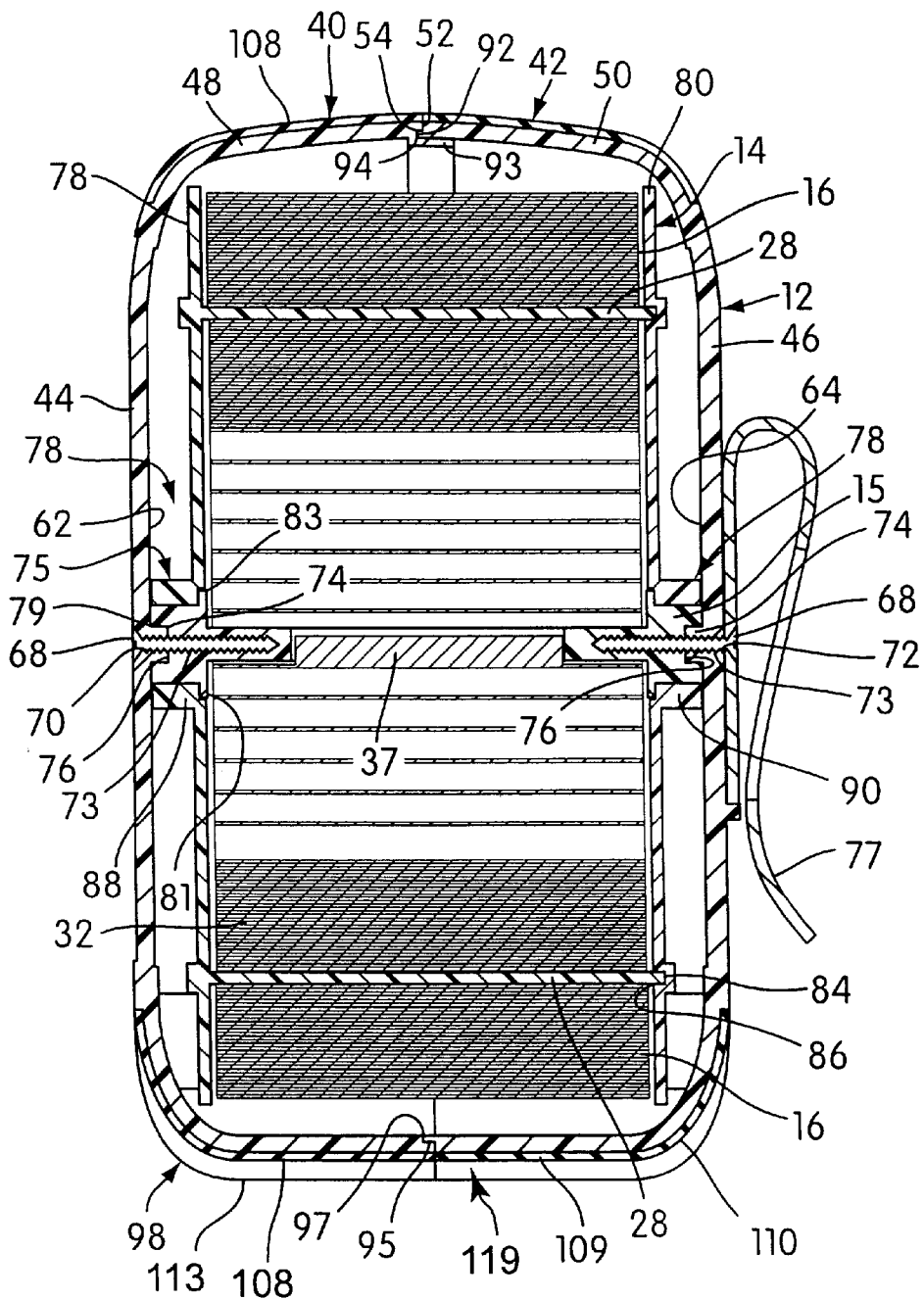
FIG. 6 is a cross-sectional view taken through the line 6—6 in FIG. 3.

FIGS. 1–3 show an exterior view of a retractable rule assembly that is generally designated 10 and is constructed according to the principles of the present invention. The rule assembly 10 includes a housing assembly 12 and a reel 14 that is rotatably mounted inside the housing assembly 12 (best seen in the cross-sectional views of FIGS. 4–6). The reel 14 is mounted in the housing assembly 12 by a reel spindle 15 that is secured within the housing assembly 12 (FIGS. 4–6). An elongated tape rule blade 16 is mounted on the reel 14.

The blade 16 is formed of a ribbon of metal, the preferred metal being steel, and the top concave surface of the blade is printed with measuring lines and digits (not shown) for measuring lengths and distances. One longitudinal end 18 of the blade 16 is connected to the reel 14 and a second longitudinal free end 20 of the blade 16 extends generally outwardly of the reel 14. The blade 16 is constructed and arranged with respect to the housing assembly 12 to extend generally from a position tangential of the reel 14 outwardly through a spaced opening 22 provided in the housing assembly 12 (as shown, for example, in FIG. 4).

Preferably the reel 14 is made of a molded plastic and is provided with slots or openings 24, 26 in a central cylindrical wall portion 28 thereof. The one end 18 of the blade terminates in a hook-like structure 30 that hookingly engages an edge of the wall portion 28 of the reel 14 at opening 24 to connect the end 18 of the blade 16 to the reel 14 (FIGS. 4, 5).

A coil spring 32 has a construction and arrangement between the housing assembly 12 and the reel 14 to rotate the reel 14 with respect to the housing assembly 12 in a direction to wind the elongated blade 16 about the reel when the blade 16 is extending outwardly of the housing assembly opening 22. The coil spring 32 is generally enclosed within the central wall portion 28 of the reel 14 (FIGS. 4–6). One longitudinal end 35 of the coil spring 32 hookingly engages an edge of the wall portion 28 of the reel 14 that defines the opening 26; a second longitudinal end 37 of the blade 16 hookingly engages the spindle 15. The spindle 15 is rigidly mounted to the housing assembly 12 in a manner considered in detail below. Preferably the spring 32 is a thin, flat ribbon of metal, the preferred metal being steel.

The blade 16 is generally movable between a fully retracted position outwardly of the housing assembly 12 to a fully extended position. The fully retracted position of the blade 16 is shown in FIG. 4 and the fully extended position of the blade is shown (in fragmentary view) in FIG. 5. It can be appreciated from a comparison of FIG. 4 and FIG. 5 that as the blade is unwound from the reel 14, the coil spring 32 is wound around the rigidly fixed spindle 15. This winding of the spring around the spindle stores energy in the spring to provide spring powered rewinding of the blade 16 around the reel 14 when the extended blade is released.

The blade 16 is constructed of a ribbon of sheet metal that is shaped during the manufacturing to have a normal or memory configuration that has a generally arcuate or concavo-convex transverse cross-section. When a portion of the blade 16 is wound about the reel 14, the wound portion has a flat transverse cross-section (FIGS. 6 and 8) and the wound layers of the coiled blade provide the wound blade with an abutting volute coil configuration. A representative transverse cross-section of the extended blade 16 showing its concavo-convex configuration is illustrated in FIG. 7. It can therefore be understood from a comparison of FIGS. 4–5 (and from a comparison of FIGS. 7–8) that when the blade 16 is wound around the reel 14, it has the flat cross-section of FIG. 8 and when the blade 16 is withdrawn from the housing assembly 12 to measure an object, it returns to the concavo-convex cross-section shown in FIG. 7. Thus, the coil spring 32 is constructed and arranged between the housing assembly 12 and the reel 14 to rotate the reel 14 about the spindle with respect to the housing assembly 12 in a direction to wind up the elongated blade 16 when extending outwardly of the housing assembly opening 22 in a normal concavo-convex cross-sectional configuration onto the reel 14 in an abutting volute coil formation in a flattened cross-sectional configuration. The concavo-convex cross-section provides the extended blade with rigidity and maintains the blade essentially straight in the longitudinal direction.

The concavo-convex cross-section of the blade generally provides the unsupported blade 16 with blade standout. As described in greater detail below, the blade 16 has a blade width, thickness and height of concavo-convex curvature sufficient to enable the blade 16 to standout arcuately a length measured along the blade of at least 10.5 feet with a horizontal linear length of standout thereof that is greater than 97 percent of the arcuate length of standout. As also described in greater detail below, the concavo-convex transverse cross-section of the blade 16 is provided with a geometry that also improves blade standout.

Generally, one skilled in the art will understand that the length of blade standout depends on many factors, including (but not limited to) blade width (i.e. the transverse width of the blade measured when the blade is in its flattened condition shown, for example, in FIG. 8 and designated F); the height of the blade 16 in the concavo-convex configuration (designated H in FIG. 7); blade thickness (designated T in FIG. 7); and the geometry of the blade transverse cross-section when the same is in its normal concavo-convex than configuration. The blade 12 has a width in the flattened condition thereof having a dimension within the broad range of from approximately 1.10 inches to approximately 1.5 inches and a height H in the concavo-convex configuration thereof having a dimension within the broad range of approximately 0.25 inch to approximately 0.40 inch. Preferably, the blade 12 has a thickness in either configuration thereof within the broad range of approximately 0.0045 inch to approximately 0.0063 inch. More preferably, the blade 12 has a width in the flattened condition thereof having a dimension within the narrower range of from approximately 1.25 inches to approximately 1.39 inches; a height H in the concavo-convex configuration thereof having a dimension within the narrower range of approximately 0.30 inch to approximately 0.35 inch; and a thickness in either configuration thereof having a dimension within the narrower range of approximately 0.005 inch to approximately 0.0056 inch. Most preferably the blade 16 width is approximately 1.25 inch, the blade height H is approximately 0.32 inch and the blade thickness T is approximately 0.0051 inch. A blade constructed according to these principles has a blade standout of up to approximately 13 feet. More specifically, a blade construction having dimensions within the broadest ranges identified immediately above for the width F, height H and thickness T can have a blade standout in the preferred broad range of at least 10.5 feet to approximately 13 feet; a blade construction having dimensions within the more preferred narrower ranges identified immediately above for the width F, height H and thickness T can have a blade standout in the range of at least 10.5 feet to approximately 12.5 feet; and a blade construction having the most preferred dimensions identified immediately above for the width F, height H and thickness T has a blade standout of approximately 11 feet.

The concavo-convex cross-section of the blade 16 has a unique geometry (shown in FIG. 7) that increases in the standout ability. The concavo-convex cross-sectional configuration of the blade 16 includes an arcuate central section 36 and integral arcuate end sections 38. Each arcuate end section 38 has the same radius of curvature (indicated for one of the two end sections 38 in FIG. 7 by the line designated R1). The central section 36 has a radius of curvature designated R2 (FIG. 7). The radii of curvature R1 for the two end sections 38 are greater than the radius of curvature R2 of the central section 36. The central section having a radius R2 extends through an angular extent designated X in FIG. 7. Preferably angle X is approximately 84 degrees.

Preferably the arcuate central section 36 has a radius of curvature R2 that is a dimension within the broad range of approximately 0.30" to approximately 0.60"; and the radius of curvature R1 of each end section 38 is a dimension within the broad range of approximately 1.0" to approximately 5.0". More preferably the arcuate central section 36 has a radius of curvature R2 that is a dimension within the narrower range of approximately 0.40" to approximately 0.50" and the radius of curvature R1 of each end section 38 is a dimension within the narrower range of approximately 2.0" to approximately 4.0". Most preferably, the arcuate central section 36 has a radius of curvature R2 of approximately 0.46" and the radius of curvature of each end section R1 is approximately 3.0".

The transverse cross-sections of prior art tape blades are either constant curves (i.e., constant radius of curvature) or are constant curves in the center of the blade with straight (i.e. flat) sections at each transverse end of the cross-section when the blade is extended. Blades constructed to have either these basic cross-sections are less stable during blade standout and show a greater tendency to buckle than blades having cross-sections constructed according to the present invention.

FIG. 9 shows a comparison of the construction and standout capabilities of three prior art rule assemblies (shown in the first six rows of the table and indicated with a bracket) with a preferred embodiment of the rule assembly 10 constructed according to the principal of the present invention (shown in the last five rows of the table). As the first column of FIG. 9 indicates, typical prior art rule blades did not exceed one inch in width (measured in the flattened, coiled configuration of the blade). The second column indicates that prior art blade thickness for a one inch blade ranged from 0.0045 inch to 0.0056 inch and produced blade having a standout length of from approximately 7 feet to approximately 9 feet as indicated in FIG. 9, the third column.

The embodiment of the rule assembly constructed according to the principles of the present invention shown in FIG. 9 has a blade width of 1.250 inches (in the flat configuration) and a blade thickness of 0.0051 inch. Preferably, the blade described in FIG. 9 has a concavo-convex cross-section in the extended configuration as described above and as shown in FIG. 8.

Figure 10:
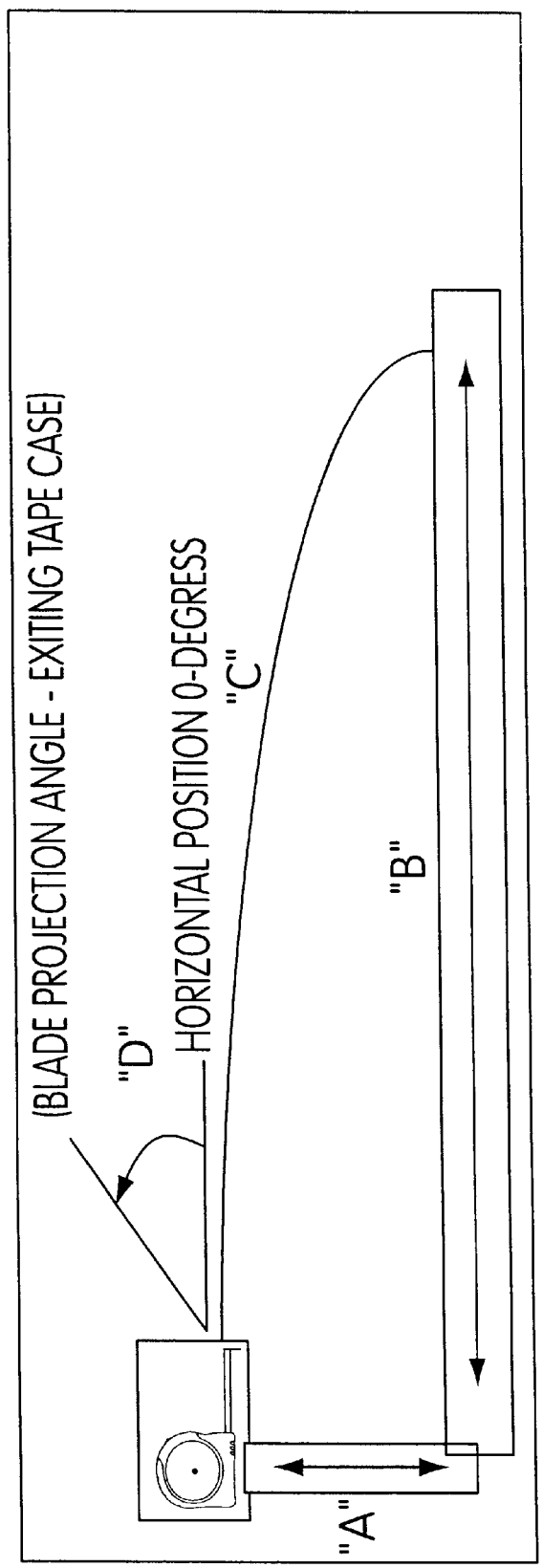
FIG. 10 is a schematic representation of an extended tape blade extending from a housing assembly to illustrate the linear length-out, arcuate length-out of the blade and the rotational angle of the housing assembly.

The last five columns in FIG. 9 compare the standout characteristics of the three prior art tape assemblies with the tape assembly 10 constructed according to the principles of the invention. The standout characteristics of the blade of a given tape assembly are best understood by comparing the arcuate (i.e., actual) length-out measured along the surface of the blade with the linear length-out of the blade. These two characteristics are often expressed as a percentage of linear length-out to arcuate length-out. FIG. 10 shows a schematic diagram that illustrates what is meant by arcuate length-out and linear length-out.

Arcuate length-out is represented by arcuate line C in FIG. 10 and is a measure of the total length of the extended portion of the blade. Linear length-out is designated B in FIG. 10 and is a measure of the linear length of the projection of the extended blade on an imaginary horizontal surface below the tape assembly 10. Line A designates the height the housing assembly 10 is required to be above the horizontal surface when the housing assembly 12 is angularly oriented with respect to the surface at an angle D to position the arcuately extending blade so that the free end thereof just touches the surface. Thus, angle D generally represents the degree of tape rule housing assembly rotation (with respect to the horizontally extending surface) required to achieve maximum standout for a given length of extended tape.

The comparison of the prior art and the present invention given in FIG. 9 indicates that the maximum prior art arcuate length-out that could be achieved with a one inch wide blade was approximately nine feet. Because of the relatively shallow (relative to the present invention) cross-sectional blade height H of approximately 0.21 inch (not shown in FIG. 9) typically used in prior art one inch blades and because of the relatively high thickness of the metal of the prior art blades (which thickness is required for the arcuate length-out to be achieved), however, the linear length-out B was approximately 93 inches. This results in a percent of linear to arcuate length-out of approximately 86 percent. It can be appreciated that the third embodiment of the prior art shown in the fourth through the sixth rows of FIG. 9 shows relatively little bending for seven feet of standout (96% linear to arcuate length-out), but that this embodiment bends a very large degree when two additional feet of the blade are extended. This high degree of arcuate bending of the 1 inch blade at standout lengths approaching 9 feet makes the task of measuring a large distance difficult for a single person using the prior art tape rule assembly. As indicated in FIG. 9, the present invention provides a rule assembly that can achieves seven feet to approximately 11 feet of arcuate length-out while maintaining the percent of linear to arcuate length-out in the approximate range of 99 percent to 98 percent. This greatly facilitates the task of measuring a length for the tape assembly user. Greater degrees of stand-out with a comparable percentage of linear to arcuate length-out can be achieved by making the blade wider. It is, for example, within the scope of the present invention to provide a blade width of 1.5 inches or greater.

It can be understood by one skilled in the art that the 1.25 inch blade width of a preferred embodiment of the assembly 10 allows the blade height H to be increased without increasing the overall blade curvature to a degree that would make reading the gradations and lettering printed on the concave surface of the blade 16 difficult. This construction results in a blade with relatively high height H that is also easy to read. (In contrast, one inch blades having a curve height of the extended blade of over 0.21 become very difficult to read and are thus not commercially practical.) Increasing the blade width of the blade of the present invention also allows the printing on the blade to be made larger, thus making measurements easier by making the blade easier to read. When the preferred 1.25 inch blade (flat width F) is in its concavo-convex cross-sectional configuration (FIG. 7), the height H thereof, as mentioned above, is approximately 0.32 inch and the curved or arcuate width W is approximately 1.018 inches. This relatively wide width W of the extended blade also facilitates reading a measurement from the blade 16.

The blade of the rule assembly 10 is thus able to achieve the approximately 11 feet of standout while improving the percent of linear to arcuate length-out relative to the prior art. This length of standout is achieved while the bottom surface of the housing is angled approximately 45 degrees with respect to the horizontal surface S (as indicated in the right most column of FIG. 9) which is comparable to the three prior art rule assembly embodiments shown in FIG. 9.

One skilled in the art will appreciate that when the rule assembly 10 is provided with a 33 foot long blade, a coil spring 32 must be provided to accommodate outward movement of the blade 16 to its fully extended position. It can be appreciated that it is desirable to construct a rule assembly 10 so that the housing assembly 12 is small enough and compact enough to fit easily in one hand of a user. Because the rule assembly 10 has a wide blade, the width of the housing assembly 12 is comparably wide. It is desirable to construct a retractable rule assembly 10 so that the height and length of the housing assembly 12 (also called the "footprint" of the housing assembly 12) are as small as possible. Because both the spring 32 and the blade 16 can be quite long in some embodiments of the invention (up to approximately 33 feet of blade length, for example), the spring 32 must be carefully constructed so that it provides sufficient spring forced to retract the fully extended blade and yet fits within a housing assembly 12 having a footprint that is dimensioned to easily fit in a user's hand.

The coil spring is constructed of a coiled ribbon of metal (typically steel). The spring force provided by the spring is approximately directly proportional to the spring width and the spring thickness. A thick spring undesirably increases the height and length of the housing assembly 12, however. It has been found that the most desirable construction of a rule assembly constructed according to the principles of the present invention has a coil spring that is relatively thin and relatively wide compared to prior art springs. Preferably the spring 32 of the rule assembly 10 has a width that is approximately 95 percent to approximately 120 percent of the width of the blade (for a given blade width in the broad range set forth above for the flattened blade). More preferably, the spring has a width that is approximately 100 percent to approximately 110 percent of the width of the metal ribbon of the blade, and is most preferably 100% of (i.e., equal to) the blade width (as shown in FIG. 9). Because the spring width is relatively great, the spring can be made the same thickness as or thinner than the blade 16. The reduction in the spring thickness relative to blade thickness (as compared to the prior art), allows the housing assembly 12 to be constructed so that it has a minimal footprint to provide a housing assembly 12 that can be easily gripped in one hand.

Typical springs used with prior art one-inch blades have a width that is less than the width of the blade, usually in the range of 0.8 to 0.89 inch. FIG. 9 shows a typical value of 0.875-inch for the spring width for all three embodiments of the one-inch blades described in the figure. Prior art spring thickness ranges from 0.0051 to about 0.0060 inch. Generally, prior art spring thickness is approximately 0.0003–0.0006 greater than the blade thickness. Thus, prior art construction uses springs that are thicker and significantly narrower than the blade. It can be appreciated that although it is possible to use this prior art construction and the present invention, it is undesirable because the relatively thick spring of the prior art would result in a housing assembly footprint that is too large to fit comfortably within the average user's hand. Thus there is a need for a new spring construction that can be used with the blade 16 that will allow the footprint of the housing assembly to be made small to be comfortably grippable using one hand.

It can thus the understood that the relatively wide spring allows the thickness of the spring to remain relatively small and this allows the footprint of the housing assembly to be small enough to be easily gripped in a single hand of the most users. More specifically, preferably, when the spring width is approximately equal to the blade width, the spring 32 of the present invention is 0 percent to 10 percent thinner than the blade 16. As another example, if the spring 32 is made one hundred twenty percent the width of the blade 16, the spring 32 is preferably 0 percent to 25 percent of thinner than the blade. In terms of actual measurement, this means that typically the spring thickness is up to 0.0005 inch thinner than the thickness of the blade. Furthermore, because the spring of the present invention is made wide relative to the width of the blade, the overall length of the spring can be made shorter relative to the length of prior art springs for comparable measuring blade 16 lengths. For example, a typical one inch wide, 25 foot long prior art blade has a spring that is approximately 240 inches in length; the length of a wide spring 32 constructed according to the principles of the present invention for the rule assembly 10 having a 25 foot blade is approximately 230 inches.

By increasing the spring width of the spring 16, the thickness of the spring can be decreased and the length decreased while still providing sufficient spring force to retract the blade without increasing the footprint of the housing assembly to an undesirable degree. Examples of specific housing assembly 12 heights for particular blade lengths will be considered below after other structural details of the construction of the rule assembly 10 are considered.

The housing assembly 12 is further constructed to easily and comfortably fit in a hand of the user because it optimizes the use of space within the housing assembly 12 to house the blade 16, coil spring and other cooperating components. The details of the internal structure of the housing assembly 12 and the blade 16 mounted therein are shown in FIGS. 4–6 and 11. Preferably the housing assembly 12 and the reel 14 are constructed of a molded plastic. As best appreciated from FIG. 6, the housing assembly 12 includes a pair of cooperating molded plastic housing members 40, 42. Each housing member 40, 42 includes an end wall 44, 46, respectively, having a peripheral wall 48, 50, respectively, extending from a periphery thereof and terminating in a free edge 52, 54, respectively. The pair of cooperating housing members 40, 42 are movable toward one another in an axial direction into cooperating relation to define the housing assembly (where "axial direction" refers to the direction of the axis of rotation of the reel defined by the spindle).

When the housing members 40, 42 are fixed together in the assembled rule assembly 10, the free edges 52, 54 are interengaged as shown in FIG. 6. A plurality of axially extending bolts 58 extend through one of the housing members 42 and threadedly engage the other housing member 40 (FIG. 11) at spaced positions adjacent the peripheral walls 48, 50. The housing members 40, 42 are also fixed together by the threaded engagement of bolts 68 with the fixed reel spindle 15. The axially extending spindle 15 is fix at a central portion of the housing assembly 12. Specifically, the fixed spindle 15 has a noncircular interengaging recess-projection connection (shown in FIG. 6 and described below) at each end thereof generally with a central interior region 62, 64, respectively, of the end walls 44, 46 of the housing assembly 12. Each end of the fixed spindle 15 is interiorly threaded to threadedly receive the bolts 68 therein. The bolts 68 extend through central holes 70, 72 formed in the respective adjacent end walls 44, 46 of the housing assembly and threadedly engage internal threading 73 in each end of the spindle 15. Each bolt 68 extends through a recess-projection connection, generally designated 75, when each bolt 68 is disposed in a respective central hole 70, 72 and threaded interior 73. A metal clip 77 is secured to one side of the housing assembly by one of the bolts 68.

Preferably the fixed spindle 15 is constructed of a molded plastic or nylon. The construction of the recess-projection connections 75 between the ends of the spindle 15 and the walls 44, 46 is shown in cross-section in FIG. 6. Each recess-projection connection 75 is identical. Specifically, projections 74 having exterior noncircular cross-sections are integrally formed on the walls 44, 46 and are received within recesses 76 having complementary non-circular interior cross-sections formed on each end of the spindle 15. The noncircular interior and exterior cross-sections cooperate to prevent rotation of the spindle 15 with respect to the housing assembly 12 when the ends of the spindle 15 are mounted on the projections 74 in the assembled rule assembly 10. Each end of the spindle 15 extends through a hole 79 of circular cross-section formed in opposite sides of the reel 14. The portions of the spindle 15 that extend through the holes 79 in the reel 14 have circular exterior cross sections. A flange 81 on the spindle 15 engages an annular groove 83 in the reel 14 surrounding the hole 79 to guide the rotation of the reel on the spindle. Thus, the reel 14 is rotatably mounted on the spindle 15 for bidirectional rotational movement of the reel with respect to the housing assembly 12. As can best be appreciated from FIGS. 4 and 6, the spindle 15 is internally slotted to receive the one longitudinal end 37 of the spring 32 to thereby secure the one end 37 of the spring to the spindle.

The molded plastic reel 14 includes two reel members 78, 80 (FIG. 6). Reel member 78 includes the integral cylindrical wall portion 28 about which the blade 12 is wound. Reel member 80 is essentially disk shaped. Each reel member 78, 80 includes an outwardly extending cylindrical wall portion 88, 90, respectively, formed around the hole 79. An annular edge portion 84 on the wall portion 82 is received within an annular groove 86 formed within reel member 80 to help hold the reel 14 together. The abutting engagement of the wall portions 88, 90 on the reel with the end walls 44, 46 of the housing assembly 12 maintain the edge portion 84 within the groove 86 in the assembled rule assembly.

The housing members 40, 42 include portions along the abutting free edges thereof 52, 54, respectively, of tongue and groove construction (FIG. 6) to help secure the molded housing members 40, 42 of the assembled rule assembly 10 together. Specifically, at a top portion of the housing assembly 12, a wall portion 92 formed on edge 54 is received within a groove 94 formed along a portion of the edge 52; and an integral wall portion 93 formed on edge 52 is disposed in underlying, abutting relation to wall portion 50 of the housing member 44. At a bottom portion of the housing assembly 12, a wall portion 95 formed along a length of edge 54 is received within a recess 97 formed on a portion of the wall portion 48 of housing member 40.

When viewed from the side elevational view, the housing assembly 12 includes only two corner portions (see FIG. 4, for example), generally designated 96, 98. One corner 96 is adjacent the housing assembly opening 22 and the other corner portion 98 is at an opposite bottom end of the housing assembly 12. The two bolts 58 are positioned in the only two corner portions 96, 98, respectively, of the housing assembly 12. Thus, it can be appreciated that the housing assembly 12 is secured together using threaded fasteners in only three locations (from the point of view of one looking at the side elevational view of, for example, FIG. 4): at the opposite corners 96, 98 (bolts 58) at the bottom portion of the housing assembly 12 and in the center of the housing assembly 12 (bolts 68). This use of the bolts 68 on opposite ends of the reel spindle 15 allows the housing assembly 12 to be secured together without using any bolts in a peripheral top portion or portions of the housing assembly 12.

This arrangement of the bolts helps reduce the size of the footprint of the housing assembly 12 to allow the housing assembly 12 for a 33-foot long blade constructed according to the principles of the invention to have up to 13 feet of blade standout, for example, to easily fit in a hand of a user. Specifically, it is within the scope of the invention to provide tape assemblies constructed according to the principles taught herein wherein the height (and length) of the housing assembly does not substantially exceed 3.65 inches for a blade length that is at most approximately 33 feet; wherein the height (and length) of the housing assembly does not substantially exceed 3.45 inches for a blade length that is at most approximately 30 feet; and wherein the height (and length) of the housing assembly does not substantially exceed 3.25 inches for a blade length that is at most approximately 8 meters.

As best appreciated from FIGS. 3–4, because the housing assembly does not require bolts in the upper periphery of the housing assembly 12, the top portion 108 of the housing assembly 12 can be made to have a relatively arcuate profile (FIG. 2, for example) that generally conforms to the profile of the reel, thus minimizing the footprint of the housing assembly 12, eliminating corners in the upper portion of the housing assembly and providing a comfortable curved top surface to receive the palm of a user's hand. This arc-shaped upper surface of the housing assembly 12 also increases impact resistance of the housing assembly 12 in case the assembly 10 is dropped.

A peripheral portion of housing assembly 12 is provided with a rubber-like coating 110 around the gripped portion of the housing assembly 12 to provide increased frictional engagement between the housing assembly and a user's hand and to provide a relatively soft comfortable surface for the user's hand.

The housing assembly 12 includes a bottom wall 109 (FIGS. 4–5) having an exterior portion 107 at an end position adjacent the housing assembly opening 22 which projects below an exterior surface portion 108 extending therefrom toward an opposite end 113 of the bottom wall 109 to provide a finger grip enhancing configuration, generally designated 119 for a gripping hand of the user. More specifically, the bottom wall 109 (FIGS. 3–4) has a forward end portion 107 adjacent the housing assembly opening 22 and a rearward end portion 113 at the opposite end of the bottom wall 109; the portion 108 of the wall 109 therebetween is generally recessed to provide the finger grip enhancing configuration 119 for the gripping hand of the user. This recessed area or gripping area 119 on the bottom of the housing assembly 12 is preferably completely covered with the overmolded rubber or rubber-like polymeric material. It can thus be appreciated that the housing assembly 12 is constructed to be easily held in one hand of a user such that the user's fingers engage the finger grip enhancing portion 119 and the user's palm and thumb are generally in overlying relation with a top portion of the housing assembly.

The housing assembly includes a fitment 118 (FIG. 11) which forms a part of the housing assembly opening 22 adjacent a convex side of the blade 16. The fitment 118 is an essentially U-shaped structure having a transversely extending cross member 115 and two upstanding arms 117 extending upwardly from opposite sides of the cross member 115. The cross member 115 defines the lower edge of the housing opening; a bottom surface 170 of the cross member 115 is flush with the adjacent surface portion 107 of the bottom wall 109 so that a bottom surface portion 170 of the fitment 118 forms part of the bottom surface of the housing assembly 12 adjacent the opening 22. The fitment 118 is preferably an integral molded plastic structure. The fitment 118 is held within appropriately sized opposing recesses 121, 123 (FIG. 11) formed in the respective housing members 40, 42 and which recesses are disposed on opposite sides of the opening 22 when the housing members 40, 42 are secured together. The cross member 115 of the fitment 118 has a plurality of tangentially extending, transversely spaced elongated ridges 120 which define surfaces 125 along the bottom of the opening 22 for engaging and supporting the convex side of the blade 16 extending tangentially from the reel 14 of the housing assembly opening 22. Thus, the ridges 120 slidably engage the convex side of the blade 16 and provide a low friction engagement between the housing assembly 12 and blade 16.

A holding assembly, generally designated to 124, is constructed and arranged to be manually actuated to hold the blade 16 in any position of extension outwardly of the housing assembly opening 22 and to release the blade 16 from any position in which it is held. The structure and operation of the holding assembly 124 is best appreciated from a comparison of FIGS. 4–5. The holding assembly 124 includes a holding member 126 mounted on the housing assembly 12 for movement in opposite directions between a normally inoperative position (FIG. 4) and a holding position (FIG. 5). It can be appreciated that the blade holding member 126 is an arcuate member that is movable along an arcuate path between the two positions as aforesaid. The holding member 126 has an interior free end portion 128 that is movable into wedging engagement with the tangentially extending portion of the blade 16 to engage and hold the blade against an interior holding structure 130 (FIG. 5) on the housing assembly 12 when the holding member 126 is in its holding position. The free end portion 128 includes a central recess 129 (FIG. 2, for example) that is described in detail below. The holding member 126 has an exterior thumb engaging portion 132 configured to be moved digitally to selectively move the holding member 126 from its normally inoperative position and its holding position. The exterior thumb engaging portion 132 is best seen in FIGS. 1–2.

Preferably the holding member 126 is an integral structure made of an appropriate durable flexible plastic. The thumb engaging portion 132 is connected by an integral outwardly extending neck portion 134 to an elongated arcuate flexible body portion 133 that terminates in the interior free end 128. The outwardly extending portion 134 is slidably held within and guided by a slot 136 formed within a front part of housing assembly 12 by the members 40, 42. The movement of a lower portion of the holding member 126 is guided by a pair of tabs 131 integrally formed on respective housing members 40, 42 (only one tab is shown in the figures). An integral locking structure 138 on the holding member 126 engages holding structure 140 (FIG. 5) integrally formed on the housing assembly 12 to releasably lock the holding member 126 in the holding position in wedging engagement with the blade 16.

More specifically, to lock the blade 16 in a given position of extension, the user (while holding the blade 16 outwardly of the housing assembly 12 against the spring force of the coil spring 32) slides the thumb engaging portion 132 downwardly with respective to the housing assembly 12 causing the locking structure 138 to slide over a ramped surface 142 on the holding structure 140 and causing the free end 128 to move in a locking direction with respect to the blade 16. The flexible plastic locking structure 138 bends resiliently outwardly slightly as it passes over the holding structure 140. After the free end 128 contacts the blade 16, continued movement of the thumb engaging portion 132 in the locking (downward) direction thereafter wedges the free end 128 of the flexible body portion 133 against blade 16 to hold the blade 16 in place against the spring force of the coil spring 32 and moves the locking structure 138 into abutting engagement with a locking surface 141 on the holding structure 140. The holding member flexes slightly as the free end 128 is wedged against the blade 16. The abutting engagement between the locking structure 138 and the locking surface 141 locks the holding member 126 in its holding position. It can be understood from FIG. 5 that the blade 16 is held in an extended position (against the spring force of the coil spring 32) between the free end 128 of the body portion 133 and the interior holding structure 130 by the downward force exerted by the wedged body portion 133. The interior holding structure 130 (not visible in detail) is a series of longitudinally spaced, transversely extending ribs that are constructed and arranged to support the convex side of the blade 16. When viewed from the point of view of FIG. 5 (i.e., on a transversely directed line of sight), the top surfaces (not visible in the FIGS.) of the ribs cooperate to provide a generally downwardly sloped support (in a direction toward the opening 22) for the blade 16; and when viewed from the front, (i.e., on a longitudinally directed line of sight) the top surfaces (not visible in the figures) of each rib of the interior holding structure 130 are transversely spaced in a concave array to receive and support the convex side of the blade.

To release the blade 16, the user pulls upwardly on the thumb engaging portion 132 which causes the locking structure 138 on the plastic holding member 126 to move resiliently outwardly and past the locking surface 141 to release the holding member 126 from engagement with a blade 16. The holding member 126 resiliently returns to its normal arcuate shape. It can be appreciated from FIG. 2 that the recess 129 on the free end 128 of the holding member 126 defines two transversely spaced teeth 147 which have spaced arcuate side surfaces 144 sized to conform to the concave surface of the blade 16 to hold the same in locked position.

It can be understood that the use of the holding member 126 when a measurement is being taken is optional. When taking a measurement, the user typically holds the housing assembly 12 in one hand and manually pulls the blade 16 out of the housing assembly 12 with the other hand. When a sufficient length of blade 16 has been withdrawn from the housing assembly 12, the user can lock the blade 16 with respect to the housing assembly 12 using the holding member 126 to prevent the blade 16 from retracting back into the housing assembly 12 (under the spring force of spring 32) when the user releases the blade 16. When the measurement has been taken, the user simply releases the holding member 126 from holding engagement with the blade 16 by moving the free end 128 thereof out of wedging engagement with the blade 16 in the manner described above. If the holding member 126 is not used during the taking of a measurement, the user can simply hold the blade 16 with his other hand while the measurement is being taken or, alternatively, the hook member 34 can be placed in hooking engagement with the workpiece to hold the blade 16 outwardly of the housing assembly 12 in a controlled and steady manner against the spring force of spring 32 while the measurement is being taken.

When the blade 16 is released after taking the measurement, the spring 32 rotates the reel 14 with respect to the housing assembly 12 in a blade-winding direction to wind the blade 16 around the reel 14. A relatively short free end portion of the blade 16 has a clear film 158 of plastic material adhered to the concave side thereof (FIG. 11) to protect the blade 16 while the same is out of the housing assembly 12 and while the blade 16 is being retracted under the spring force of the spring 32 back into the housing assembly 12. Preferably the film is made of polyurethane and is adhered to the blade by an acrylic adhesive. It is also contemplated to use Mylar® and Nylon® to construct the film. Preferably the film has a thickness dimension within the range of approximately 0.006 inches to approximately 0.014 inches. It is within the scope of the invention to apply this film to the blade of any known tape rule assembly.

Preferably the self adhering film 158 is placed over several leading inches (preferably within a broad range of approximately 2 inches to approximately 12 inches) of the free end 20 of the blade 16, including the portion of the blade on which the hook member 34 is disposed so that preferably the film goes under the hook member 34 all the way to the free end 20 of the blade 16. More preferably, the film 158 is applied a length from the free end 20 of the blade 16 that is less than 10.5 inches; and most preferably, the length of the blade 16 from the free end thereof that is covered by the film 158 is approximately 6 inches. It is generally desirable to have the film-covered portion end at approximately the point on the blade 16 where the volutes of the coiled blade are in overlying relation to one another when the blade 16 is in its fully retracted configuration. Typically in a tape rule assembly, the tape blade starts to wrap on itself at approximately 9.5 inches when a typical reel size of approximately 2.9 inches in outer diameter is used in the construction. The film 158 is provided because most failures in a rule blade 16 occur within the first six inches of the free end of the blade 16 from cracks or tearing. The cracks or tearing occur because when the blade is wound back around reel under the spring force of the coil spring, the free end of the blade tends to "whip" as it enters the opening 22, causing the last several inches of the blade 16 to hit against the housing assembly 12. This can cause cracking or breaking of the free end of the blade 16 over time. The protective film 158 prevents these cracks and tears and other damage to the blade 16 associated with blade whipping.

The free end of the blade 16 is frequently handled by the user and this handling can over time cause the numbering and markings on the concave side of the blade 16 to wear off or become difficult to read. The film 158 prevents this damage because it covers the numbering and markings on the free end of the blade and thereby protects the same from being worn off.

The construction of the hook member 34 and the manner in which it is disposed on the free end 20 of the blade 16 is best seen in FIGS. 1–4, 11. Preferably the end hook member 34 is formed of sheet metal of predetermined thickness and includes a concavo-convex mounting portion 150 (FIG. 11) having a U-shaped hook portion 152 bent at a generally right angle from an end of the concavo-convex mounting portion 150. The hook member 34 is mounted on the free end 20 of the blade 16 with the mounting portion 150 thereof secured in limited sliding engagement with a concave side of the free end 20 of the blade 16 and in overlying relation thereto.

More specifically, the mounting portion 150 is provided with large holes 167 (FIG. 4) and a plurality of rivets 169 extend through the holes 167 to slidably mount the hook member 34 to the blade 16 for limited longitudinal relative movement between the hook member 34 and the blade 16 (i.e., the diameter of each hole 167 is greater than the diameter of the associated rivet 169 by an amount approximately equal to the desired amount of hook movement). The limited sliding engagement allows the blade 16 to be measured externally from an external surface 161 of the U-shaped hook portion or internally from an internal surface 163 of the U-shaped hook portion 152. In other words, the sliding movement of the hook member 34 allows an accurate measurement to be taken with either surface 161 or 163 in abutting relation with the workpiece; the holding member 34 slides longitudinally with respect to the blade 16 a distance approximately equal to the thickness of the hook portion 152 (where the thickness is measured from surface 161 to surface 163) so that a measurement taken with either surface 161 or 163 in abutting engagement with the workpiece will yield an accurate measurement.

The U-shaped hook portion 152 includes a bight section 160 extending transversely downwardly from a convex side of the free end of the blade 16 and spaced leg sections 162 extending beyond transversely spaced corners 171 of the free end of the blade. The bight section 160 of the hook portion 152 of the hook member 34 provides an under-catch structure that can hookingly engage a workpiece to facilitate extension of the blade 16 and to temporarily secure the blade to the workpiece while a measurement is being taken. As can be appreciated from FIG. 11, the leg sections 162 extend beyond the longitudinally extending edges of the blade 16 to provide a side catch surface on each side of the blade that 16 can be used to hook the blade to an object or workpiece. The side catch structure provided by the legs 162 can function to secure the free end of the blade 16 during a measurement. The side catch structure provided by the leg sections 162 also allow the blade 16 to be easily and steadily held in a tilted position relative to a surface of the workpiece, thereby allowing a longitudinally extending edge of the blade 16 to be held against the workpiece. More specifically, when the convex side of the blade 16 is against the workpiece, the longitudinal edges are normally spaced from the surface because of the concavo-convex cross-section of the blade 16. The legs 162 of the hook member 34 provide a side catch that can be hooked over an edge of the workpiece to allow the user to hold steadily a longitudinal edge of the blade very close to or directly against the workpiece when the convex side of the blade 16 is against the workpiece, which facilitates reading a measurement. This is helpful in taking measurements because the curve height H of the cross section is preferably approximately 0.32 of an inch so that the curve height of the blade is relatively high.

The upper portions of the leg sections 162 extend generally upwardly and outwardly above the concave side of the blade 16 (FIG. 11) to provide structure above the concave surface of the blade 16 to hookingly engage the workpiece to facilitate extension of the blade 16 and to hold the free end of the blade 16 while a measurement is being read. For example, the blade 16 can be placed against a workpiece such that the concave side of the blade 16 is facing the workpiece and such that the opposite longitudinal edges of the blade 16 abut a surface on the workpiece at a point where they measurement is to be read. When the blade 16 is in this position, the upwardly extending portions of the legs 162 on the hook member 34 can be used to hold the free end 20 of the blade 16 against the workpiece.

It can also be appreciated from FIGS. 1–2 that the hook-shaped portion 152 of the hook member 34 provides an aesthetically pleasing "face" appearance on the front of the rule assembly 10 when the blade 16 is in the fully retracted position. Transversely spaced corners 171 on the free end 20 of the blade 16 are mitered (FIG. 4) inwardly from opposite longitudinal edges of the blade 16; the leg sections 162 of the hook member 34 extend beyond the mitered corners 171 on the opposite edges of the end 20 of the blade 16. The mitered corners 171 prevent the user from being scratched or cut by the corners on the end of blade 16. Preferably each corner 171 is mitered inwardly from the respective opposite longitudinal edge starting at a distance of approximately 3/32 of an inch from the free end of the blade 16.

Figure 11:
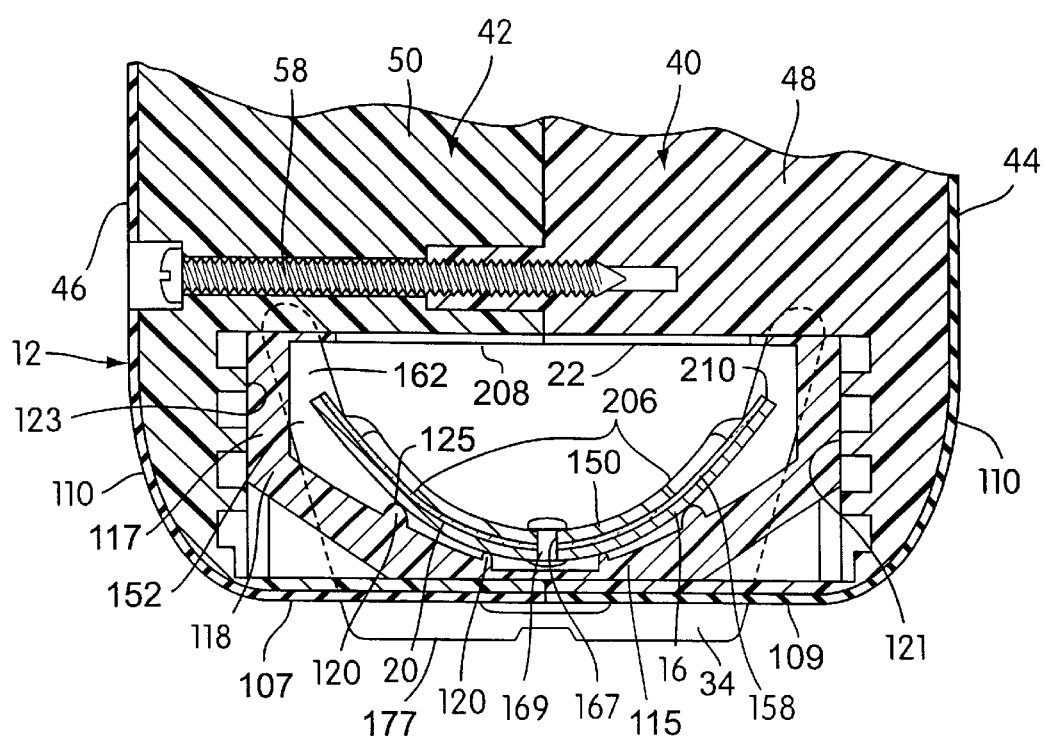
FIG. 11 is a cross-sectional view of a fragment of the tape rule assembly taken through the line 11—11 of FIG. 4.

Preferably, the housing opening 22 has a height dimension that exceeds the height dimension of the hook member mounting portion 150 and its connection with the free end of the blade 16 by an amount which is at least approximately equal to the amount the hook portion 152 of the hook member 34 extends below a bottom end surface 170 of the housing assembly 12 at the housing opening 22 when the hook member 34 is at the housing opening 22 (FIG. 11). This height of the opening 22 is provided to prevent possible damage to the hook member 34 when the blade 16 is fully retracted and the hook member 34 is impacted (by dropping or the like) in a direction that tends to move the hook member 34 upwardly with respect to the opening 22.

The details of the construction of the housing opening 22 can be appreciated from FIGS. 4 and 11. It can be appreciated that the axially extending fastener 58 in the corner 96 must be spaced upwardly in the housing assembly 12 a sufficient distance to allow the opening 22 to have sufficient height to protect the hook member during impact. The location of this fastener 58 in the corner 96 is restricted by the dimensions of the corner 96. Specifically, the arcuate path followed by the arcuate holding member 126 between its inoperative position and its blade holding position defines the interior extent of the bottom corner 96 of the housing assembly and a lower front wall portion 200 at the front of the housing assembly 12 generally defines the forward extent of the bottom corner 96. Thus, it can be appreciated FIG. 4 that the tape assembly 10 must be constructed so that the holding member 126 and the front wall portion 200 cooperate to allow the fastener 58 to be positioned upwardly relative to the housing assembly 12 sufficiently to allow the housing opening 22 to have the height as aforesaid. The heights of prior art housing openings are generally restricted by the position of a fastener over the housing opening. Prior art housing assembly construction prevented the fastener from being spaced upwardly far enough to provide an opening having a height dimension large enough to protect the hook member from impact damage as aforesaid. The present invention overcomes this problem by constructing the lower front wall portion 200 of the housing assembly so that it is essentially flush with the central portion 204 of the front of the housing assembly. By positioning the lower front wall portion 200 essentially flush with the central front wall portion 204, the associated axially extending fastener 58 can be moved upwardly sufficiently to allow the housing assembly opening 22 to have a height as recited sufficient to protect the hook member in the event of impact. Specifically, the increased housing opening height allows the bottom edge 177 to move upwardly to a position flush with the bottom surface 170 of the housing assembly 12 adjacent the opening 22 before the mounting portion 150 of the hook member 34 impacts any downwardly facing surfaces on the housing assembly 12.

It can be appreciated from FIG. 4 that in the exemplary embodiment of the tape assembly 10, the interior free end 128 of the holding member 126 is disposed generally above the mounting portion 150 of the hook member 34 when the hook member 34 is at the opening 22. The recess 129 is provided in the free end 128 of the holding member 126 so that if the hook member 34 is caused to move upwardly in the opening 22 because of an impact, the free end 128 of the holding member 126 does not prevent upward movement of the hook member 34 in the opening 22 so that the bottom edge 177 can move upwardly to a position flush with exterior housing assembly 12 bottom end surface 170. More particularly, the central recess 129 is of a width to operatively accommodate the width of the hook member mounting portion 150. Therefore when the hook member 34 is forced upwardly in housing opening 22 by an impact, the mounting portion 150 moves upwardly into the recess 129, thereby allowing the bottom edge 177 of the hook member 34 to move upwardly sufficiently so that it is flush with the bottom end surface 170 of the housing assembly adjacent the opening 22. If the recess 129 were not provided, the free end 128 of the holding member 126 could possibly restrict the upward movement of the mounting portion 150 so that an impact on the hook portion 152 of the holding member 34 could bend of the hook member 34 against the holding member 126. The recess 129 precludes the possibility of this type of damage to the hook member 34 by allowing the holding a member 126 to move upwardly in the housing assembly opening 22 at least far enough to allow the bottom edge 177 to move flush with the surface 170 at the bottom end of the housing assembly 12.

The opening 22 is constructed to allow the hook member 34 to move upwardly in the opening 22 until the upper edges of the mounting portion 150 impacts structure at the top of the opening 22. More specifically, it can be appreciated from FIGS. 4 and 11 that the lateral edges of the mounting portion 150 adjacent the hook portion 152 provide upwardly facing surfaces 206 which engage one or more downwardly facing surfaces 208 defining the housing opening 22 to limit the upward movement of the hook member 34 within the opening 22. The lateral longitudinally extending edges 210 of the blade 16 extend upwardly and outwardly beyond the upwardly facing surfaces 206 of the hook member mounting portion 150, but the edges 210 do not limit the upward movement of the hook member 34 in the opening 22. This is because when the hook member 34 moves upwardly in the opening 22 during impact, the edges 210 of the blade 16 engage the downwardly facing housing opening surfaces 208 and deflect resiliently outwardly before the mounting portion 150 of the hook member 34 engages of the upwardly facing surfaces 206. In other words, in the exemplary embodiment of the tape assembly 10 shown, the concavo-convex cross sectional curve height of the blade 16 is such that the edges 210 are normally above the upwardly facing surfaces 206 on the mounting structure 150 of the hook member 34. When the hook member 34 at the opening 20 is moved upwardly with respect to the housing assembly opening 22 by an impact, the edges 210 of the blade 16 impact the upper portion of the opening 22 first, causing the edges 210 of the blade to flex outwardly in opposite directions, slightly flattening the blade 16 to a degree sufficient to allow the mounting portion 150 of the hook member 34 to move toward and into contact with the downwardly facing surfaces 208 at housing opening 22. When the upwardly facing surfaces 206 on a mounting portion abut the downwardly facing surfaces 208 at the opening 22, the hook member 34 reaches the upper limiting position of its upward movement in the housing opening. This upper limiting position is usually not reached, however, because preferably the tape assembly 10 is constructed and arranged such that the bottom edge 177 of the hook member 34 moves upwardly to a position flush with the surface 170 on the bottom of the housing assembly 12 before the upwardly facing surfaces 206 on the hook member 34 impact the downwardly facing surfaces 208 on the housing assembly 12. When the bottom end 177 of the hook member 34 is flush with the bottom end surface 170 of the housing assembly, the hook member 34 is protected with further impact, thereby preventing damage to the hook member 34.

It can be understood that the coiled blade 16 has a tendency to unwind and return to a straight (in the longitudinal direction), extended configuration of concavo-convex cross-section. This tendency provides a downward force on the free end 20 of the fully retracted blade 16 with respect to the housing assembly opening 22 that maintains the extended portion of the fully retracted blade 16 against the bottom of the housing assembly interior at the opening 22 and thereby normally maintains a portion of the hook member 34 of the fully retracted blade 16 below the bottom surface 170 of the exterior of the housing assembly 12. This allows the tape assembly user to easily hook the hook member 34 on a structure such as a workpiece because a portion of the hook member 34 is normally below the surface 170.

One skilled in the art will understand that the embodiment of the tape rule assembly 10 shown in the figures and described above is exemplary only and not intended to be limiting. It is within the scope of the invention to provide any known tape rule assembly with any or all of the features of the present invention. For example, the clear film of plastic material can be applied to any known tape rule assembly. Similarly, an end hook member constructed according to the principles of the present invention can be applied to any known rule assembly.

The features of the housing assembly including the molded plastic construction, the shape of the housing, the use of relatively few bolts, the elimination of bolts in the upper portion of the housing assembly, the manner in which the spindle is mounted therein, the height dimension of the housing assembly opening relative to the dimension of the downwardly extending portion of the hook member on the free end of the blade and construction of the finger engaging portion on the bottom surface of housing assembly can be used separately or in combination on any existing tape rule assembly.

Similarly, the geometry of the cross-section of the blade and the general teachings of the dimensions and construction of the blade and coil spring can be used on any existing tape rule assembly.

The construction of the fitment, including the construction of the tangentially extending transversely spaced elongated ridges thereof can be used on any known tape rule assembly. It can also be understood that even though it is preferable to construct the tape rule assembly having the ridges on a separate fitment, it is contemplated to provide an embodiment of the tape rule assembly in which the ridges are formed integrally on the housing members of the housing assembly. It can also be appreciated that it is contemplated to use any of the aforementioned features singly or in any appropriate combination on a tape rule assembly that has a spring-powered retractable blade or, alternatively, on any tape rule assembly in which the blade is manually retracted.

It can be appreciated by one skilled in the art that it is within the scope of the present invention to apply the teachings presented herein to construct a tape measure of a wide range of sizes and that it is not intended to limit the invention to the embodiments or to the specific measurements or ranges of measurements presented herein. It can be understood, for example, that it is within the scope of the invention to construct a retractable tape measure assembly that includes a one inch wide (i.e., flattened width) tape blade with increased standout. Because it is contemplated to provide tape measure assemblies with the features of the invention enumerated herein separately or in any combination, it can be understood that a wide range of tape measure assemblies having one inch wide blades could be constructed. More specifically, a tape measure assembly having one inch wide blade could include for example, a cross-section blade geometry; a small footprint housing; a hook member; a protective film; a housing opening height and hook member size; and/or a fitment with transversely extending ribs all as described above in any combination.

It will thus be seen that the objects of the present invention have been fully and effectively accomplished. It will be realized, however, that the foregoing specific embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A retractable rule assembly comprising
 a housing assembly;
 a reel rotatably mounted in said housing assembly;
 an elongated blade formed of a ribbon of metal having one end connected to said reel constructed and arranged with respect to said housing assembly to extend from a position tangential to said reel outwardly through a spaced opening in said housing assembly;
 a coil spring formed of a ribbon of metal having a construction and arrangement between said housing assembly and said reel to rotate said reel in said housing assembly in a direction to wind up the elongated blade when extending outwardly of said housing assembly opening in a normal concavo-convex cross-sectional configuration onto said reel in an abutting volute coil formation in a flattened cross-sectional configuration; and a blade holding assembly constructed and arranged to be manually actuated to hold the blade in any position of extension outwardly of said housing assembly opening and to release the blade from any position in which it is held;

said elongated metal blade being made of steel and having a width in said flattened configuration thereof having a dimension within the range of approximately 1.25"–1.39", and a height in the concavo-convex configuration thereof having a dimension within the range of 0.30"–35".

2. A retractable rule assembly according to claim 1, wherein said elongated metal blade has a width in the flattened configuration thereof of approximately 1.25".

3. A retractable rule assembly comprising a housing assembly;

a reel rotatably mounted in said housing assembly;

an elongated blade formed of a ribbon of metal having one end connected to said reel constructed and arranged with respect to said housing assembly to extend from a position tangential to said reel outwardly through a spaced opening in said housing assembly;

a coil spring formed of a ribbon of metal having a construction and arrangement between said housing assembly and said reel to rotate said reel in said housing assembly in a direction to wind up the elongated blade when extending outwardly of said housing assembly opening in a normal concavo-convex cross-sectional configuration onto said reel in an abutting volute coil formation in a flattened cross-sectional configuration; and a blade holding assembly constructed and arranged to be manually actuated to hold the blade in any position of extension outwardly of said housing assembly opening and to release the blade from any position in which it is held;

said elongated metal blade having a width in said flattened configuration thereof having a dimension within the range of approximately 1.25"–1.39" and a height in the concavo-convex configuration thereof having a dimension within the range of 0.25"–0.40";

said elongated metal blade being made of steel and having a top concave surface of the blade printed with measuring lines and digits;

said concavo-convex cross-sectional configuration having an arcuate central section having a radius of curvature of approximately 0.30" to approximately 0.60", and two integrally formed end sections on opposite sides of said central section with a different configuration than said central section.

4. A retractable rule assembly as claimed in claim 3, wherein said end sections are arcuate.

5. A retractable rule assembly as claimed in claim 4, wherein said arcuate end sections have a radius of curvature greater than said central section.

6. A retractable rule assembly as claimed in claim 5, wherein said radius of curvature of said end arcuate sections is between approximately 1.0" to approximately 5.0".

7. A retractable rule assembly according to claim 3, wherein said elongated steel blade has a width in the flattened configuration thereof of approximately 1.25".

8. A retractable rule assembly according to claim 3, wherein said elongated steel blade has a height in the concavo-convex configuration thereof having a dimension of 0.30"–0.35".

9. A retractable rule assembly comprising a housing assembly;

a reel rotatably mounted in said housing assembly;

an elongated blade formed of a ribbon of metal having one end connected to said reel constructed and arranged with respect to said housing assembly to extend from a position tangential to said reel outwardly through a spaced opening in said housing assembly;

a coil spring formed of a ribbon of metal having a construction and arrangement between said housing assembly and said reel to rotate said reel in said housing assembly in a direction to wind up the elongated blade when extending outwardly of said housing assembly opening in a normal concavo-convex cross-sectional configuration onto said reel in an abutting volute coil formation in a flattened cross-sectional configuration; and a blade holding assembly constructed and arranged to be manually actuated to hold the blade in any position of extension outwardly of said housing assembly opening and to release the blade from any position in which it is held;

said elongated metal blade having a width in said flattened configuration thereof having a dimension of approximately 1.25" and a height in the concavo-convex configuration thereof having a dimension within the range of 0.30"–0.35";

said elongated metal blade being made of steel and having a top concave surface of the blade printed with measuring lines and digits;

said concavo-convex cross-sectional configuration having an arcuate central section having a radius of curvature of approximately 0.30" to approximately 0.60", and two integrally formed end sections on opposite sides of said central section with a different configuration than said central section.

10. A retractable rule assembly according to claim 9, wherein said end sections are arcuate.

11. A retractable rule assembly according to claim 10, wherein said arcuate end sections have a radius of curvature greater than said central section.

\* \* \* \* \*